United States Patent [19]

Schröder

[11] 4,152,004
[45] May 1, 1979

[54] BUILDING MACHINE, PARTICULARLY AN EXCAVATOR

[75] Inventor: Klaus D. Schröder, Kirchdorf, Fed. Rep. of Germany

[73] Assignee: Leibherr Hydraulikbagger GmbH, Kirchdorf, Fed. Rep. of Germany

[21] Appl. No.: 802,954

[22] Filed: Jun. 2, 1977

[30] Foreign Application Priority Data

Jun. 8, 1976 [DE] Fed. Rep. of Germany ....... 2625679

[51] Int. Cl.² .............................................. B60P 1/18
[52] U.S. Cl. ................................. 280/111; 267/65 D; 280/64; 280/714
[58] Field of Search .................. 280/6 R, 6.1, 64, 111, 280/706, 708, 714, 112 A; 267/65 C, 65 D, 15 A

[56] References Cited

U.S. PATENT DOCUMENTS

| 3,077,952 | 2/1963 | Neises | 280/64 |
| 3,909,035 | 9/1975 | Aikawa | 280/708 |

FOREIGN PATENT DOCUMENTS 2450236  4/1976  Fed. Rep. of Germany ............. 37/194

Primary Examiner—Joseph F. Peters, Jr.
Assistant Examiner—John A. Carroll
Attorney, Agent, or Firm—Fleit & Jacobson

[57] ABSTRACT

In a wheeled vehicle such as an excavator, a pivotable axle for two of the wheels can be locked against pivoting by means of two blocking cylinders each of which is controlled by its own valve. Each valve is closed by venting a control conduit and applying a valve member against a seating, the valve member being subjected to the action of a return spring.

5 Claims, 2 Drawing Figures

BUILDING MACHINE, PARTICULARLY AN EXCAVATOR

The invention relates to a building machine, particularly an excavator, comprising at least one pivotable axle and two valve-controlled blocking cylinders for the pivotable axle.

In such building machines it is known that conflicting problems have to be solved. The building machine is equipped with pivotable axles so that the two or multi-axle vehicle will rest with all four wheels in constant contact with the driving surface or ground, particularly in the case of rubber-wheeled building machines. Nevertheless, building machines such as excavators require a secure position so as to be usable for their intended purpose. The secure position is achieved by blocking the pivotability of the pivotable axle.

A known excavator equipped with a pivotable axle can pivot with its wheels about a fulcrum. The pivotable axle is equipped with two blocking cylinders consisting of a cylinder and a piston. The oil chambers of the blocking cylinders are interconnected by pipe conduits which incorporate a controlled blocking valve for blocking the pipe connection between the two blocking cylinders.

For the practical application of the working machine, it is important that the blocked axle retains this condition under the usual operating conditions. However, with the known working machine there is a danger of tilting if the pipe conduit fractures under a hydraulic pressure that can be brought about by the predominantly one-sided loading that, for example, occurs regularly in the case of fully pivotable excavators. Since the known building machines are provided with directional valves, leakage oil losses can give rise to pivoting that might be small but is nevertheless undesirable. This pivoting can be avoided only by repeated actuation of the valve. Also, it is disadvantageous from a safety point of view that the valve can be opened by the operator when the working machine is primarily supported on only one wheel of the pivotably mounted axle. This, again, presents a danger of tilting.

The invention is therefore based on the problem of avoiding the danger of tilting.

The solution of this problem in a building machine of the aforementioned kind resides in that each blocking cylinder is associated with its own blocking valve which closes by venting a control conduit and applying a ball to a valve seat, the ball being subjected to the action of a return spring. In addition to solving the stated problem, a building machine according to the invention has the advantage that the valve operates without oil leakage.

In a particularly advantageous embodiment of the invention, the hydraulic pressure in the cylinder chamber beyond which the ball can no longer be lifted off its valve seat can be determined by the area of a diaphragm dimensioned in dependence on the control pressure in the control conduit. In this way the opening force of the control valve is adaptable to the hydraulic pressure existing in the cylinder chamber in such a way that opening of the blocking valve will not be possible when there is a danger of tilting.

The invention will now be described with reference to an example illustrated in the drawing, wherein.

Figure 1:
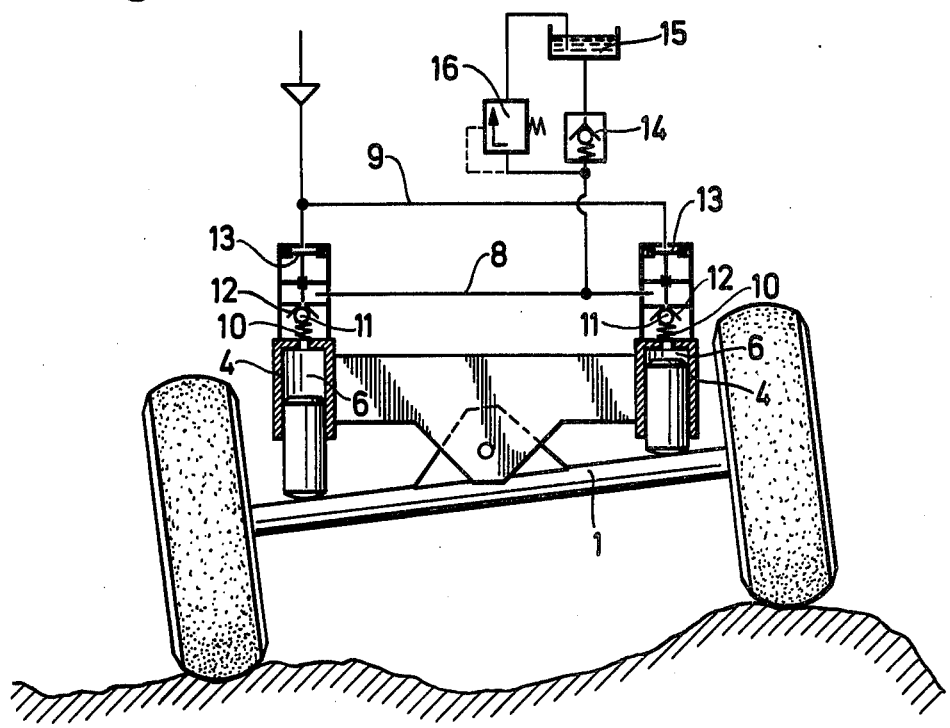
FIG. 1 is a diagrammatic cross-section of an excavator.
Figure 2:
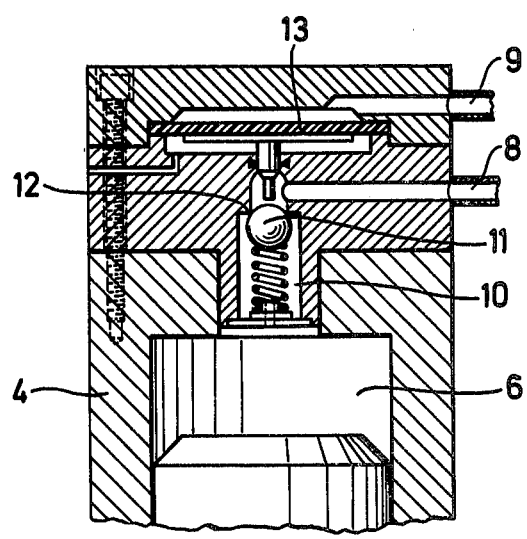
FIG. 2 is an enlarged representation of the upper portion of a blocking cylinder.

As will be evident from FIG. 1, the building machine comprises a pivotable axle 1 and two blocking cylinders 4 which act on the pivotable axle. Each blocking cylinder 4 is associated with its own blocking valve which is built directly onto each of the two blocking cylinders as will be clear from FIG. 1. The blocking valve contains a ball 11 which is subjected to the action of a return spring 10 and is pressed tightly against a valve seat 12, thereby closing the valve. Further, for the purpose of closing the valve a control conduit 9 is vented. The pipe conduit 8 between the blocking cylinders 4 is thus separate therefrom and does not constitute a safety risk.

The valve itself is free of leakage oil so that its function will not be impeded even after a prolonged period of blocking.

In the vicinity of the control conduit 9, a diaphragm 13 is disposed above the valve seat 12. By proper dimensioning of the area of the diaphragm 13 in relation to the control pressure in the control conduit 9, the hydraulic pressure in the cylinder chamber 6, which pressure exerts on the ball by way of the valve seat 12 a force acting against the opening force, can be simply determined in a manner such that the valve can only just be opened. In other words, the opening force of the blocking valve is adaptable to the hydraulic pressure existing in the cylinder chamber so that opening will no longer be possible when there is a danger of tilting.

Further, the excavator is equipped with a storage vessel 15 for oil and a check valve 14. In this way oil losses in the blocking cylinders 4 can be replaced when the pivotable axle is not blocked.

Finally, the hydraulic system includes a pressure limiting valve 16. When necessary, this enables a pressure build up caused by heating of the oil to be reduced when the system is not blocked.

I claim:

1. A building machine comprising at least one pivotable axle, two valve-controlled blocking cylinders associated with said pivotable axle for blocking said axle in a desired position; a blocking valve directly mounted on each of said blocking cylinders and having a valve housing containing a ball, a valve seat and, a return spring for urging said ball into contact with said valve seat thereby closing said blocking valve, and a control conduit associated with said blocking valves in such manner that venting of the control conduit closes said blocking valves.

2. A building machine according to claim 1, further comprising a diaphram positioned in said valve housing above said valve seat, the hydraulic pressure in the cylinder chambers of said blocking cylinders beyond which said ball can no longer be lifted off its valve seat being determined by the area of said diaphragm, said diaphragm being dimensioned in dependence on control pressure in the control conduit.

3. A building machine according to claim 1, further comprising a storage vessel for pneumatic fluid, and conduit means including a check valve for connecting said storage vessel and said blocking cylinders, fluid losses occurring in said blocking cylinders being replaceable from said storage vessel by way of said conduit means through said check valve.

4. A building machine according to claim 2 further comprising a storage vessel for pneumatic fluid, and conduit means including a check valve for connecting said storage vessel and said blocking cylinders, fluid losses occurring in said blocking cylinders being replaceable from said storage vessel by way of said conduit means through said check valve.

5. A building machine according to claim 1 wherein the building machine is an excavator.

* * * * *

UNITED STATES PATENT AND TRADEMARK OFFICE
CERTIFICATE OF CORRECTION

PATENT NO. : 4,152,004
DATED : May 1, 1979
INVENTOR(S) : Klaus D. SCHRODER

It is certified that error appears in the above-identified patent and that said Letters Patent are hereby corrected as shown below:

In Section [73], under Assignee, change "Leibherr Hydraulikbagger GmbH", to --Liebherr Hydraulikbagger GmbH--.

Signed and Sealed this

Eighth Day of April 1980

[SEAL]

*Attest:*

SIDNEY A. DIAMOND

*Attesting Officer*     *Commissioner of Patents and Trademarks*